(12) United States Patent
Kim et al.

(10) Patent No.: US 11,083,038 B2
(45) Date of Patent: Aug. 3, 2021

(54) METHOD FOR REPORTING MOBILITY HISTORY OF UE AND DEVICE SUPPORTING THE SAME

(71) Applicant: LG Electronics Inc., Seoul (KR)

(72) Inventors: Hongsuk Kim, Seoul (KR); Bokyung Byun, Seoul (KR); Youngdae Lee, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/269,801

(22) Filed: Feb. 7, 2019

(65) Prior Publication Data

US 2019/0254105 A1    Aug. 15, 2019

Related U.S. Application Data

(60) Provisional application No. 62/630,283, filed on Feb. 14, 2018.

(51) Int. Cl.
*H04W 76/27* (2018.01)
*H04W 8/02* (2009.01)
*H04W 88/02* (2009.01)

(52) U.S. Cl.
CPC ............ *H04W 76/27* (2018.02); *H04W 8/02* (2013.01); *H04W 88/02* (2013.01)

(58) Field of Classification Search
CPC ..... H04W 24/10; H04W 76/27; H04W 88/02; H04W 8/02
See application file for complete search history.

(56) References Cited

U.S. PATENT DOCUMENTS

| | | | |
|---|---|---|---|
| 2017/0142766 A1* | 5/2017 | Kim | H04W 48/20 |
| 2017/0311278 A1* | 10/2017 | Adjakple | H04W 68/005 |
| 2018/0054796 A1* | 2/2018 | Edge | H04W 64/003 |

\* cited by examiner

*Primary Examiner* — Saad A. Waqas
(74) *Attorney, Agent, or Firm* — Dentons US LLP

(57) ABSTRACT

Provided are a method of reporting mobility history of an UE and a device supporting the method. According to one embodiment of the present invention, the method includes: leaving radio resource control (RRC) connected state; logging altitude information of the aerial UE when a specific condition is satisfied; and transmitting the altitude information when the aerial UE enters RRC connected state.

16 Claims, 8 Drawing Sheets

METHOD FOR REPORTING MOBILITY HISTORY OF UE AND DEVICE SUPPORTING THE SAME

CROSS-REFERENCE TO RELATED APPLICATIONS

Pursuant to 35 U.S.C. § 119 (e), this application claims the benefit of U.S. Provisional Application No. 62/630,283, filed on Feb. 14, 2018, the contents of which are all hereby incorporated by reference herein in their entirety.

BACKGROUND OF THE INVENTION

Field of the Invention

The present invention relates to a wireless communication system, and more particularly, to a method for reporting mobility history of UE and a device supporting the same.

Related Art

Efforts have been made to develop an improved $5^{th}$-generation (5G) communication system or a pre-5G communication system in order to satisfy a growing demand on radio data traffic after commercialization of a 4th-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Meanwhile, in the study item of the aerial vehicles, the mobility history reporting has discussed to support improved mobility performance similarly with the legacy LTE feature. And it was concluded that the mobility history reporting is possibly used to solve potential interference or mobility problems which are caused by unpredictable mobility of the aerial vehicles, different neighboring cell interferences, and even the aerial vehicle identification.

SUMMARY OF THE INVENTION

According to a prior art, in the aerial environments, speed of the aerial vehicles may be usually faster than the terrestrial UEs on the ground and the number of detected neighbor cells may be mostly larger than the terrestrial UEs cases. Because of these points, only the legacy mobility history reporting is not enough to support mobility scenarios of the aerial vehicles.

According to an embodiment of the present invention, a method performed by an aerial user equipment (UE) in a wireless communication system is provided. The method may comprise: leaving radio resource control (RRC) connected state; logging altitude information of the aerial UE when a specific condition is satisfied; and transmitting the altitude information when the aerial UE enters RRC connected state.

The altitude information may include vertical speed.

The altitude information may include height of the aerial UE.

The specific condition may be at least one of a condition that a periodic timer is expired and/or a condition that the aerial UE enters a cell and exits from the cell The method may further include receiving information on a threshold from a network.

The altitude information may inform whether the aerial UE is above the threshold or below the threshold.

The information on the threshold may be provided via RRC dedicated signaling message from the network.

The RRC dedicated signaling message may be at least one of RRC setup message, RRC resume message, RRC reconfiguration message and/or UE information request message.

The altitude information may be transmitted via a UE information response message.

According to another embodiment of the present invention, a method performed by a base station (BS) in a wireless communication system is provided. The method may comprise: receiving altitude information when an aerial user equipment (UE) enters resource control (RRC) connected state to the base station; and estimating the mobility state of the aerial UE based on the altitude information.

The altitude information may include vertical speed.

The altitude information may be logged when a specific condition is satisfied.

The specific condition may be at least one of a condition that a periodic timer is expired and/or a condition that the aerial UE enters a cell and exits from the cell.

The altitude information may inform whether the aerial UE is above a threshold or below the threshold.

According to another embodiment of the present invention, a user equipment (UE) in a wireless communication system is provided. The UE may comprise: a transceiver for transmitting or receiving a radio signal; and a processor coupled to the transceiver, the processor configured to: leave radio resource control (RRC) connected state; log altitude information of the aerial UE when a specific condition is satisfied; and control the transceiver to transmit the altitude information when the aerial UE enters RRC connected state.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
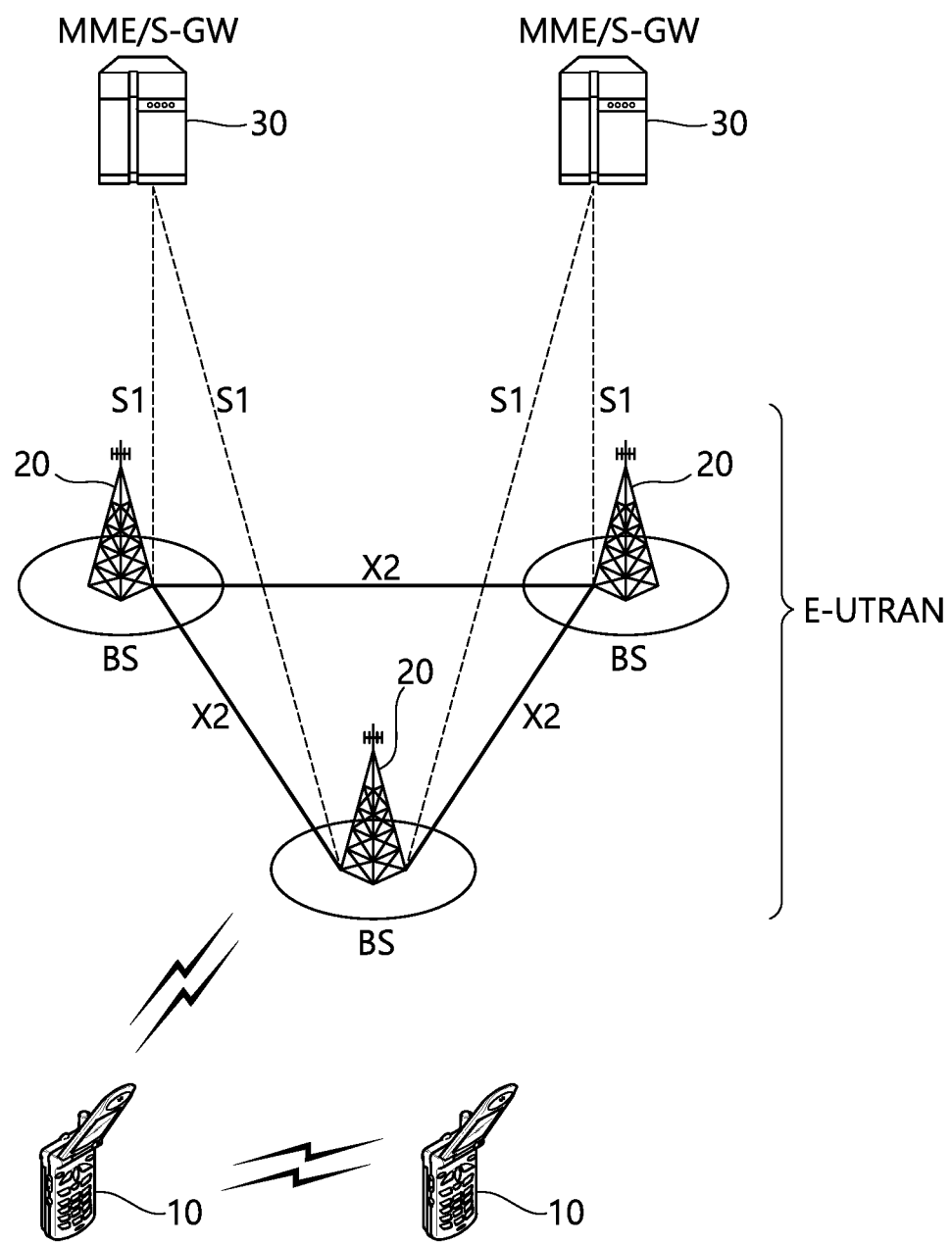
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
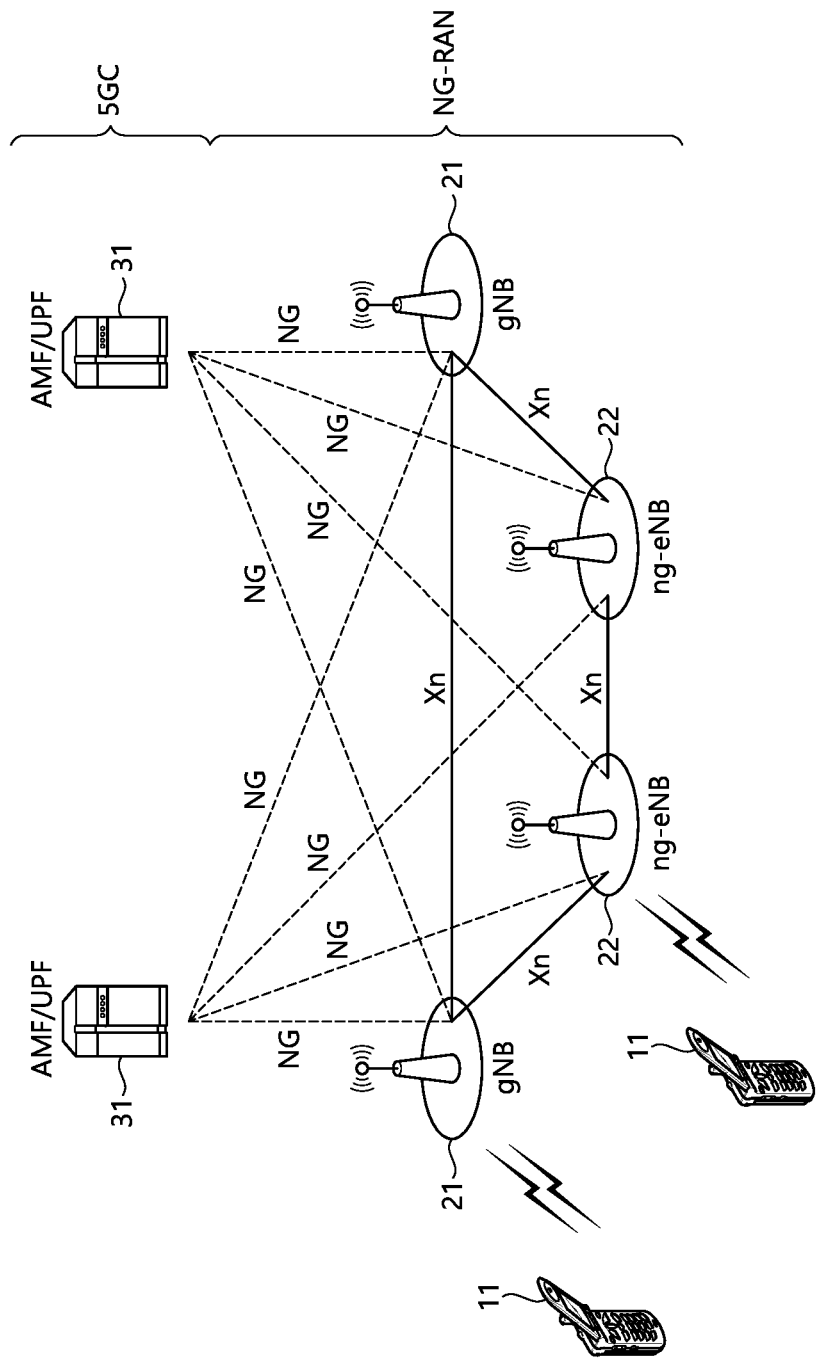
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
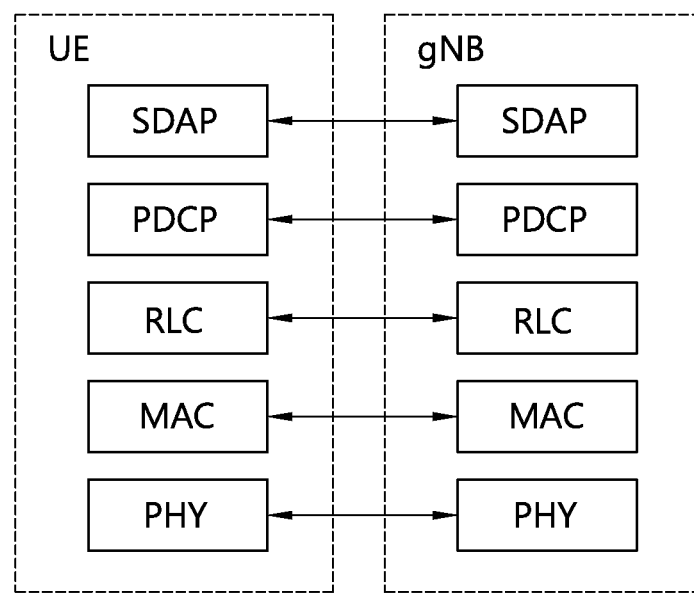
FIG. 3 shows a block diagram of a user plane protocol stack to which technical features of the present invention can be applied.
Figure 4:
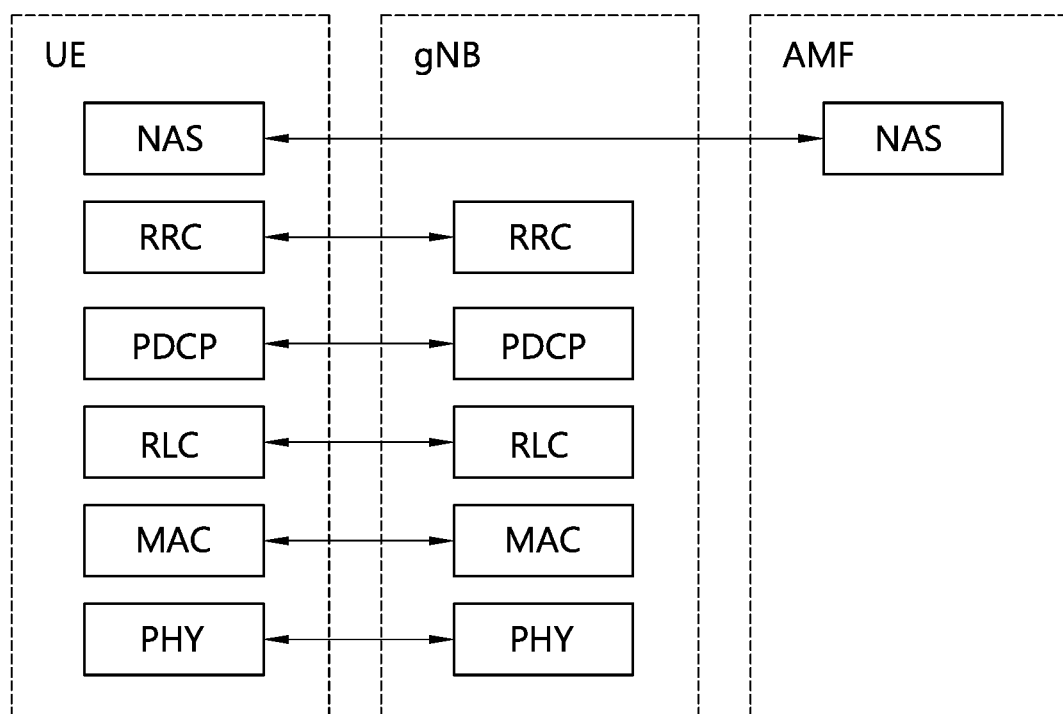
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Hereinafter, mobility history information is described.

This procedure specifies how the mobility history information is stored by the UE, covering RRC_CONNECTED and RRC_IDLE.

If the UE supports storage of mobility history information, the UE shall:

1> Upon change of cell, consisting of PCell in RRC_CONNECTED or serving cell in RRC_IDLE, to another E-UTRA or inter-RAT cell or when entering out of service:
2> include an entry in variable VarMobilityHistoryReport possibly after removing the oldest entry, if necessary, according to following:
3> if the global cell identity of the previous PCell/serving cell is available:
4> include the global cell identity of that cell in the field visitedCellId of the entry;
3> else:
4> include the physical cell identity and carrier frequency of that cell in the field visitedCellId of the entry;
3> set the field timeSpent of the entry as the time spent in the previous PCell/serving cell;

1> upon entering E-UTRA (in RRC_CONNECTED or RRC_IDLE) while previously out of service and/or using another RAT:
2> include an entry in variable VarMobilityHistoryReport possibly after removing the oldest entry, if necessary, according to following:
3> set the field timeSpent of the entry as the time spent outside E-UTRA The IE VisitedCellInfoList includes the mobility history information of maximum of 16 most recently visited cells or time spent outside E-UTRA. The most recently visited cell is stored first in the list. The list includes cells visited in RRC_IDLE and RRC_CONNECTED states. The UE variable VarMobilityHistoryReport includes the mobility history information. The TimeSpent indicates the duration of stay in the cell or outside E-UTRA approximated to the closest second. If the duration of stay exceeds 4095s, the UE shall set it to 4095s.

Table 1 shows the IE VisitedCellInfoList.

TABLE 1

```
-- ASN1START
VisitedCellInfoList-r12 ::=  SEQUENCE (SIZE (1..maxCellHistory-r12))
    OF VistedCellInfo-r12
VisitedCellInfo-r12 ::=      SEQUENCE {
    visitedCellId-r12            CHOICE {
        cellGlobalId-r12             CellGlobalIdEUTRA,
        pci-arfcn-r12                SEQUENCE {
            physCellId-r12               PhysCellId,
            carrierFreq-r12              ARFCN-ValueEUTRA-r9
        }
    }                                                 OPTIONAL,
    timeSpent-r12                INTEGER (0..4095),
    ...
}
-- ASN1STOP
```

Hereinafter, mobility history reporting is described.

E-UTRAN initiates the procedure by sending the UEInformationRequest message. E-UTRAN should initiate this procedure only after successful security activation.

Upon receiving the UEInformationRequest message, the UE shall, only after successful security activation:

1> if mobilityHistoryReportReq is set to true:
2> include the mobilityHistoryReport and set it to include entries from VarMobilityHistoryReport;
2> include in the mobilityHistoryReport an entry for the current cell, possibly after removing the oldest entry if required, and set its fields as follows:
3> set visitedCellId to the global cell identity of the current cell:
3> set field timeSpent to the time spent in the current cell;

In Long Term Evolution (LTE), a mobility history reporting which is used to help the network estimates UE speed is proposed to support seamless and proper handover in providing maintaining user's quality of services. The mobility history reporting is one of features of mobility prediction to identify future target eNB, to reduce handover latency, to reduce interference caused by neighbours, and to enhance mobility performance on the ground. For unmanned aerial vehicle (UAV) environments, RAN2 had also studied different interference scenarios which bring out different mobility scenarios of the aerial vehicles below:

As identified DL interference problem for the aerial environments, since the aerial vehicles experience line-of-sight (LOS) propagation conditions to more cells with higher probability than terrestrial UEs, the aerial vehicles will receive interference from more cells in the downlink than a typical terrestrial UE could.

As identified UL interference problem for the aerial environments, the aerial vehicles degrade throughput performance of the terrestrial UEs with the similar reason of the identified DL interference problem which is that UL power of the aerial vehicles cause increasing UL interference to larger number of neighbor cells and the terrestrial UEs.

Thus, in the study item of the aerial vehicles, the mobility history reporting has discussed to support improved mobility performance similarly with the legacy LTE feature. And it was concluded that the mobility history reporting is possibly used to solve potential interference or mobility problems which are caused by unpredictable mobility of the aerial vehicles, different neighboring cell interferences, and even the aerial vehicle identification. That is, Mobility History information may be used to help the network estimates UE speed in LTE precisely.

Especially in the aerial environments, speed of the aerial vehicles may be usually faster than the terrestrial UEs on the ground and the number of detected neighbour cells may be mostly larger than the terrestrial UEs cases. Because of these points, we may think that only the legacy mobility history reporting is not enough to support mobility scenarios of the aerial vehicles. According to the handover simulation results of RAN2 aerial study item, between 60 km/h and 160 km/h, it can be observed that the mobility (handover) rate of terrestrial UEs is lower than that of the aerial vehicles. And as height (altitude) increases, the mobility (handover) rate firstly increases obviously, and then decreases slightly. Even though this result cannot be applied to all scenario cases but important point is that the network may wrongly estimate the speed of the aerial vehicles depends on the aerial vehicle's altitude if the network supports only the existing mobility history information.

In order to solve the problem described above, according to embodiments of the present invention, a method for reporting mobility history is proposed. According to an embodiment of the present invention, to support the improved mobility history reporting considering the aerial vehicle's characteristics, additional logging information is needed to prevent wrong mobility estimation. In RRC_IDLE or RRC_CONNECTED state, if the aerial vehicles are able to log their altitude information for reporting the mobility information, it definitely may help the network estimates the actual aerial vehicle's speed in the aerial environments. Because the network is able to apply the aerial vehicle's characteristics according to the logged altitude information along with time spent information in the mobility history reporting. Thus, the embodiments of the present invention propose that when cell reselection in RRC_IDLE or handover in RRC_CONNECTED is occurred, the aerial vehicle logs its altitude information for reporting the mobility history information. That is, when serving cell is changed by cell re-selection or handover, UE may log its altitude along with time spent in the previous cell.

According to an embodiment of the present invention, the IE VisitedCellInfoList described in Table 1 may be modified as Table 2.

TABLE 2

```
-- ASN1START
VisitedCellInfoList-r12 ::= SEQUENCE (SIZE (1..maxCellHistory-r12))
OF VistedCellInfo-r12
VisitedCellInfo-r12 ::=        SEQUENCE {
    visitedCellId-r12              CHOICE {
        cellGlobalId-r12               CellGlobalIdEUTRA,
```

TABLE 2-continued

```
        pci-arfcn-r12                  SEQUENCE {
            physCellId-r12                 PhysCellId,
            carrierFreq-r12                ARFCN-ValueEUTRA-r9
        }
    }                                                      OPTIONAL,
    timeSpent-r12                  INTEGER (0..4095),
    serialAltitude                 OCTET STRING           OPTIONAL,
    ...
}
-- ASN1STOP
```

The field 'aerialAltitude' may indicate the height of the UE in the cell. The parameter is used like other altitude information. The first/leftmost bit of the first octet contains the most significant bit.

According to an embodiment of the present invention, the method performed by User Equipment (i.e. UE) may operate as followings.

UE may store or log mobility history information including location information if the UE supports storage of mobility history information when at least one of the conditions are satisfied.

Upon entering a network (e.g. E-UTRA or NR)
  Upon change of cell (e.g. gNB or eNB), consisting of PCell in RRC_CONNECTED or serving cell in RRC_IDLE, to another network (e.g. within same E-UTRA or NR) or inter-RAT cell
  When entering out of service Before the UE store or log the mobility history information, UE may remove the oldest entry if necessary. To store or log mobility history information, UE may set the one or more following information if available.

Global cell identity
  Physical cell identity and carrier frequency
  Time spent in the previous PCell/serving cell
  Altitude/horizontal or vertical speed of the UE in the previous PCell/serving cell
  Rough location information (i.e. high/medium/low location) of the UE in the previous PCell/serving cell Regard to altitude/horizontal or vertical speed of the UE in the previous PCell/serving cell, the logging period for location information can be set based on period (periodic based) or event (event based). In periodic based, the period may be decided by UE (i.e. every 100 ms), or the period may be decided by network (i.e. every 100 ms). In event based, the UE may log the location information when entering and exiting point of the cell.

Regard to rough location information, this information may be set by one or more threshold information (e.g. altitude below threshold or above threshold) which is optionally provided by network. The network may provide the threshold(s) via RRC dedicated signalling message (e.g. RRCConnectionSetup/RRCConnectionResume/RRCConnectionReconfiguration/UEInformationRequest) or broadcasting System information.

For example, the UE may log the rough location information based on threshold(s). When altitude/horizontal or vertical speed becomes above threshold(s), UE may decide the rough location information is 'high location'. When altitude/horizontal or vertical speed becomes below threshold(s), UE may decide the rough location information is 'low location'. If multiple thresholds are configured, when some altitude/horizontal or vertical speed becomes above the threshold but other altitude/horizontal or vertical speed becomes below threshold, UE may decide the rough location information is 'medium location'.

Regard to rough location information, Logging period for location information may be set based on period (periodic based) or event (event based). In periodic based, the period may be decided by UE (i.e. every 100 ms), or the period may be decided by network (i.e. every 100 ms). In event based, the UE may log the rough location information when entering and exiting point of the cell, or whenever rough location information is changed (i.e. from high location to low location).

The rough location information may be used to save quantity of mobility history information since same or similar altitude/horizontal or vertical speed would be redundant information to the network.

Whenever the UE enters RRC_CONNECTED state to a new cell of the network, the UE may indicate that mobility history reporting is available to the new cell via RRC signalling message if the UE has logged mobility history information. Upon reception of request for the mobility history reporting from the network (e.g. reception of UEInformationRequest), the UE may report the absolute location information (e.g. altitude or horizontal/vertical speed) or the rough UE location information (e.g. altitude below threshold or above threshold) via the mobility history reporting (e.g. in UEInformationResponse message).

Meanwhile, since it may be burden to some aerial vehicles while the aerial vehicles are operating such as the terrestrial UEs on the ground e.g., flight at low altitude and statically 3 km/h speed etc. To make efficient mobility history reporting, the aerial vehicle may need to exclude not essential information which doesn't affect significant point to network to estimate the aerial vehicle's mobility.

Therefore, it may be proposed that when the aerial vehicle enters RRC_CONNECTED, the aerial vehicle may report simple UE altitude information (e.g. below threshold or above threshold) via the mobility history reporting. In other words, when UE enters RRC_CONNECTED, UE reports rough UE location information (e.g. altitude below threshold or above threshold) via the mobility history reporting. The threshold information may be provided by UE Information Request message or the information can be also provided by other RRC (dedicated) signalling messages e.g., RRC Connection Reconfiguration if the network already certificated or identified the UE is the aerial type. The granularity of the altitude in the mobility history information is FFS.

According to embodiments of the present invention, the network may precisely estimate mobility state of UE, by considering the altitude information of the UE.

Figure 5:
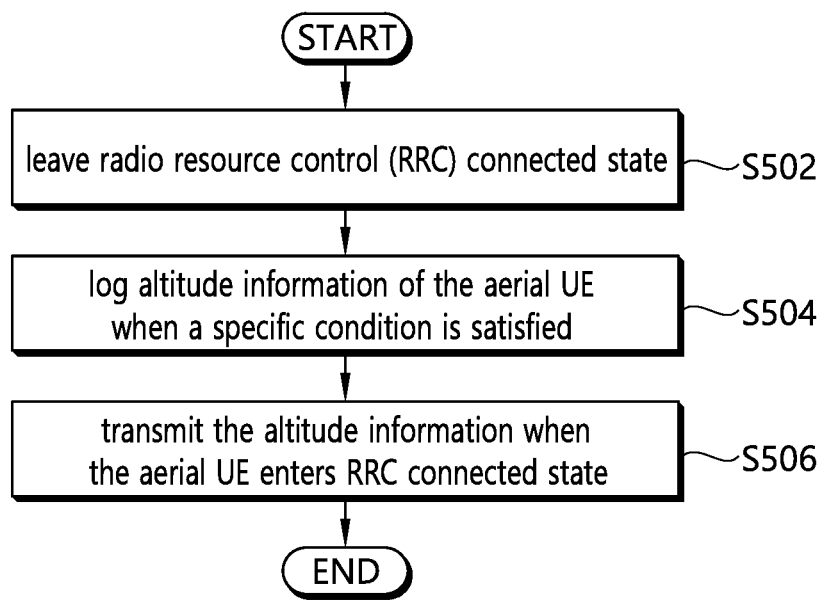
FIG. 5 shows an example of reporting mobility history according to an embodiment of the present invention.

FIG. 5 shows an example of reporting mobility history according to an embodiment of the present invention.

In step S502, the aerial UE may leave radio resource control (RRC) connected state. In other words, the aerial UE may enter RRC inactive state or RRC idle state, from the RRC connected state.

In step S504, the aerial UE may log altitude information of the aerial UE when a specific condition is satisfied. The specific condition may be at least one of a condition that a periodic timer is expired and/or a condition that the aerial UE enters a cell and exits from the cell. The altitude information may include height of the aerial UE. The altitude information may include vertical speed.

In step S506, the aerial UE may transmit the altitude information when the aerial UE enters RRC connected state. The altitude information may include cell identity (ID) of the cell and altitudes when the aerial UE enters the cell and exits from the cell. The altitude information may inform whether the aerial UE is above a threshold or below the threshold. For that, the aerial UE may receive information on a threshold from a network. The information on the threshold may be provided via RRC dedicated signaling message from the network. The RRC dedicated signaling message may be at least one of RRC setup message, RRC resume message, RRC reconfiguration message and/or UE information request message. The altitude information may be transmitted via a UE information response message.

Figure 6:
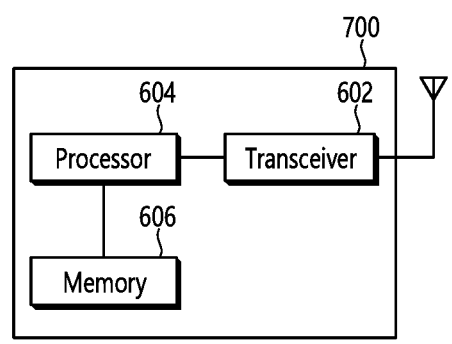
FIG. 6 shows a structure of UE according to an embodiment of the present invention.

FIG. 6 shows a structure of UE according to an embodiment of the present invention. In this embodiment, the UE may be an aerial UE.

According to an embodiment of the present invention, the UE 600 may comprise transceiver 602, processor 604 and memory 606. The memory 606 is coupled to the processor 604, and stores a variety of information for driving the processor 604. The transceiver 602 is coupled to the processor 604, and transmits and/or receives a radio signal. The processor 604 implements the proposed functions, procedures, and/or methods. In the aforementioned embodiments, an operation of the UE 600 may be implemented by the processor 604.

The processor 604 may include application-specific integrated circuit (ASIC), other chipset, logic circuit and/or data processing device. The memory 606 may include read-only memory (ROM), random access memory (RAM), flash memory, memory card, storage medium and/or other storage device. The transceiver 602 may include baseband circuitry to process radio frequency signals. When the embodiments are implemented in software, the techniques described herein can be implemented with modules (e.g., procedures, functions, and so on) that perform the functions described herein. The modules can be stored in memories and executed by processor 604. The memory 606 can be implemented within the processor 604 or external to the processor 604 in which case those can be communicatively coupled to the processor 604 via various means as is known in the art.

The processor 604 may be configured to leave radio resource control (RRC) connected state.

The processor 604 may be configured to log altitude information of the aerial UE when a specific condition is satisfied. The specific condition may be at least one of a condition that a periodic timer is expired and/or a condition that the aerial UE enters a cell and exits from the cell. The altitude information may include height of the aerial UE. The altitude information may include vertical speed.

The processor 604 may be configured to control the transceiver 602 to transmit the altitude information when the aerial UE enters RRC connected state. The altitude information may include cell identity (ID) of the cell and altitudes when the aerial UE enters the cell and exits from the cell. The altitude information may be transmitted via a UE information response message.

The processor 604 may be configured to control the transceiver 602 to receive information on a threshold from a network. The altitude information may inform whether the aerial UE is above the threshold or below the threshold. The information on the threshold may be provided via RRC dedicated signaling message from the network. The RRC dedicated signaling message may be at least one of RRC setup message, RRC resume message, RRC reconfiguration message and/or UE information request message.

Figure 7:
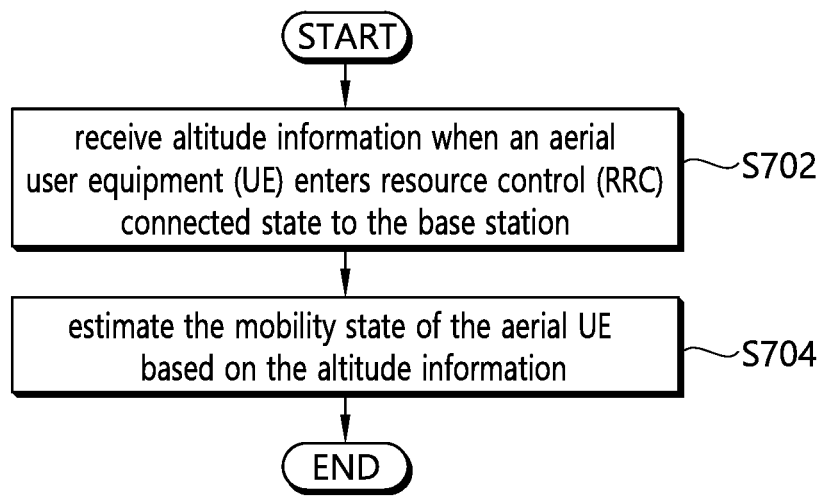
FIG. 7 shows an example of reporting mobility history according to an embodiment of the present invention.

FIG. 7 shows an example of reporting mobility history according to an embodiment of the present invention.

In step S702, a base station (BS) may receive altitude information when the aerial UE enters RRC connected state to the network. The altitude information may include vertical speed. The altitude information may be logged when a specific condition is satisfied. The specific condition may be at least one of a condition that a periodic timer is expired and/or a condition that the aerial UE enters a cell and exits from the cell. The altitude information may include cell identity (ID) of a cell and altitudes when the aerial UE enters the cell and exits from the cell. The altitude information may be transmitted via a UE information response message.

In step S704, the BS may estimate the mobility state of the aerial UE based on the altitude information.

Meanwhile, the aerial UE may receive a threshold related to reporting mobility history from a network. The threshold may be provided via RRC dedicated signaling message by the network. The RRC dedicated signaling message may be at least one of RRC setup message, RRC resume message, RRC reconfiguration message and/or UE information request message.

Figure 8:
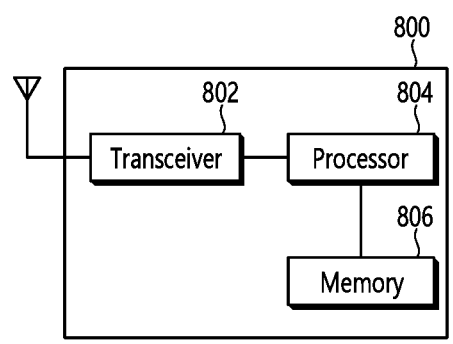
FIG. 8 shows a structure of BS according to an embodiment of the present invention.

FIG. 8 shows a structure of base station (BS) according to an embodiment of the present invention. In this embodiment, a BS 800 may be at least one of eNB or gNB, and also may be referred as a serving cell.

According to an embodiment of the present invention, the BS 800 may comprise transceiver 802, processor 804 and memory 806. The memory 806 is coupled to the processor 804, and stores a variety of information for driving the processor 804. The transceiver 802 is coupled to the processor 804, and transmits and/or receives a radio signal. The processor 804 implements the proposed functions, procedures, and/or methods. In the aforementioned embodiments, an operation of the BS 800 may be implemented by the processor 804.

The processor 804 may include application-specific integrated circuit (ASIC), other chipset, logic circuit and/or data processing device. The memory 806 may include read-only memory (ROM), random access memory (RAM), flash memory, memory card, storage medium and/or other storage device. The transceiver 802 may include baseband circuitry to process radio frequency signals. When the embodiments are implemented in software, the techniques described herein can be implemented with modules (e.g., procedures, functions, and so on) that perform the functions described herein. The modules can be stored in memory 806 and executed by processor 804. The memory 806 can be implemented within the processor 804 or external to the processor 804 in which case those can be communicatively coupled to the processor 804 via various means as is known in the art.

The processor 804 may be configured to control the transceiver 802 to receive altitude information when the aerial UE enters RRC connected state to the network. The altitude information may include vertical speed. The altitude information may be logged when a specific condition is satisfied. The specific condition may be at least one of a condition that a periodic timer is expired and/or a condition that the aerial UE enters a cell and exits from the cell. The altitude information may include cell identity (ID) of a cell and altitudes when the aerial UE enters the cell and exits from the cell. The altitude information may be transmitted via a UE information response message.

The processor 804 may be configured to estimate the mobility state of the aerial UE based on the altitude information.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A,B,C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by an aerial user equipment (UE) in a wireless communication system, the method comprising:

receiving, from a first base station, information related to one or more thresholds;

entering a radio resource control (RRC) inactive state or an RRC idle state in a cell of the first base station;

identifying a cell change or entering an out of service state during the RRC inactive state or the RRC idle state;

storing mobility history information including a cell identity of a previous cell, a time spent in the previous cell, and altitude information of the aerial UE, based on the cell change or the entering out of service state;

entering an RRC connected state in a cell of a second base station;

transmitting, to the second base station, a first message indicating that reporting the mobility history information is available, based on entering the RRC connected state;

receiving, from the second base station, a second message requesting the mobility history information; and transmitting, to the second base station, a third message including the mobility history information, after entering the RRC connected state, wherein, in the case of the aerial UE height being less than the one or more thresholds, the altitude information indicates a low location, wherein, in the case of the aerial UE height being greater than the one or more thresholds, the altitude information indicates a high location, wherein, in the case of the one or more thresholds being more than one threshold, and the aerial UE height being greater than one threshold and less than another threshold of the more than one threshold, the altitude information indicates a medium location, and wherein the aerial UE is capable of flight.

2. The method of claim 1, wherein the altitude information includes information related to vertical speed.

3. The method of claim 1, further comprising:
storing the mobility history information, based on an expiration of a periodic timer or exiting from a cell.

4. The method of claim 1, wherein the altitude information includes the height of the aerial UE.

5. The method of claim 1, wherein the information related to the one or more thresholds is received via a RRC dedicated signaling message.

6. The method of claim 5, wherein the RRC dedicated signaling message comprises at least one of a RRC setup message, a RRC resume message, a RRC reconfiguration message or a UE information request message.

7. The method of claim 1, wherein the altitude information is transmitted via a UE information response message.

8. The method of claim 1, further comprising:
storing the mobility history information, based on the height of the aerial UE crossing over the threshold.

9. The method of claim 1, wherein the mobility history information generated by the aerial UE includes at least one parameter that is not included in mobility history information of a terrestrial UE.

10. The method of claim 1, wherein the information related to the threshold is received from the first base station based on the first base station identifying that the aerial UE is an aerial type UE.

11. The method of claim 1, wherein the altitude information is used to estimate, at the second base station, a speed of the aerial UE in the aerial environments.

12. The method of claim 1, wherein the information related to the one or more threshold is received via system information.

13. A method performed by a base station (BS) in a wireless communication system, the method comprising:
performing a procedure for transitioning a state of an aerial user equipment (UE) from a radio resource control (RRC) inactive state or an RRC idle state to a RRC connected state;
receiving, from the aerial UE, a first message indicating that reporting the mobility history information is available;
transmitting, to the aerial UE, a second message requesting the mobility history information in response to the first message;
receiving, from the aerial UE, mobility history information; and
estimating a mobility state of the aerial UE based on the mobility history information,
wherein the mobility history information includes a cell identity, a time spent in a previous cell, and altitude information of the aerial UE,
wherein the cell identity and the altitude information are stored at the aerial UE based on a cell change or entering an out of service state of the aerial UE while the aerial UE is in the RRC inactive state or the RRC idle state,
wherein, in the case of the aerial UE height being less than one or more thresholds, the altitude information indicates a low location,
wherein, in the case of the aerial UE height being greater than the one or more thresholds, the altitude information indicates a high location,
wherein, in the case of the one or more thresholds being more than one threshold, and the aerial UE height being greater than one threshold and less than another threshold of the more than one threshold, the altitude information indicates a medium location, and
wherein the aerial UE is capable of flight.

14. The method of claim 13, wherein the altitude information includes information related to vertical speed.

15. The method of claim 13, wherein the altitude information is stored at the aerial UE, based on an expiration of a periodic timer or the aerial UE exiting from a cell.

16. An aerial user equipment (UE) in a wireless communication system, the aerial UE comprising:
a transceiver; and
a processor operatively coupled to the transceiver and configured to:
receive, from a first base station, information related to one or more thresholds;
enter a radio resource control (RRC) inactive state or an RRC idle state in a cell of the first base station;
identify a cell change or entering an out of service state during the RRC inactive state or the RRC idle state;
store mobility history information including a cell identity of a previous cell, a time spent in the previous cell, and altitude information of the aerial UE, based on the cell change or the entering of the out of service state;
enter an RRC connected state in a cell of a second base station;
transmit, to the second base station, a first message indicating that reporting the mobility history information is available, based on entering the RRC connected state;
receive, from the second base station, a second message requesting the mobility history information; and
transmit, to the second base station, a third message including the mobility history information, after the aerial UE enters the RRC connected state,
wherein, in the case of the aerial UE height being less than the one or more thresholds, the altitude information indicates a low location,
wherein, in the case of the aerial UE height being greater than the one or more thresholds, the altitude information indicates a high location,
wherein, in the case of the one or more thresholds being more than one threshold, and the aerial UE height being greater than one threshold and less than another threshold of the more than one threshold, the altitude information indicates a medium location, and
wherein the aerial UE is capable of flight.

* * * * *